United States Patent [19]

Jansson et al.

[11] 3,821,585

[45] June 28, 1974

[54] TUNGSTEN-HALOGEN INCANDESCENT LAMP WITH GROUP IVA METAL GETTER, AND METHOD OF MANUFACTURE

[75] Inventors: Sven A. Jansson; Earl A. Gulbransen, both of Pittsburgh, Pa.

[73] Assignee: Westinghouse Electric Corporation, Pittsburgh, Pa.

[22] Filed: Apr. 30, 1973

[21] Appl. No.: 356,017

[52] U.S. Cl................ 313/178, 313/174, 313/222, 316/19, 316/25
[51] Int. Cl............................................ H01j 61/26
[58] Field of Search...... 313/174, 178, 222; 316/19, 316/25

[56] References Cited
UNITED STATES PATENTS
3,416,022  12/1968  Mayer............................... 313/178

*Primary Examiner*—Herman Karl Saalbach
*Assistant Examiner*—Darwin R. Hostetter
*Attorney, Agent, or Firm*—D. S. Buleza

[57] ABSTRACT

An incandescent lamp having a tungsten filament is dosed with a small carefully-controlled quantity of iodine or bromine gas and concurrently purged of water, oxygen, hydrogen, carbon monoxide and carbon dioxide by placing a selected amount of hafnium iodide, titanium iodide, or zirconium iodide (or bromides of such metals) within the envelope during lamp manufacture. The additive material, upon being heated by the filament when the latter is first energized, volatilizes and releases iodine (or bromine) gas and provides free hafnium, titanium or zirconium (Groups IVA metals) within the finished lamp which serves as a getter and eliminates the water cycle. The desired halogen-dosing and gettering action can also be achieved by forming a composite consisting of a thermally-decomposable halide which is disposed in a matrix of the getter-metal (or an alloy thereof) and placing it inside the envelope in heat-receptive relationship with the filament. A getter-metal (or alloy) component that is precharged with iodine or bromine gas and releases the latter when heated can also be employed.

10 Claims, 3 Drawing Figures

PATENTED JUN 28 1974  3,821,585

TUNGSTEN-HALOGEN INCANDESCENT LAMP WITH GROUP IVA METAL GETTER, AND METHOD OF MANUFACTURE

BACKGROUND OF THE INVENTION

1. Field of the Invention

This invention relates to electric incandescent lamps and has particular reference to an improved tungsten-halogen type lamp and a method of dosing such a lamp with a controlled amount of a halogen and, at the same time, gettering gaseous impurities from the lamp atmosphere.

2. Description of the Prior Art

Halogen-containing incandescent lamps are well known in the art. A lamp of this type in which the regenerative cycle is sustained by an inert gas fill that contains a small quantity of iodine is described in U.S. Pat. No. 2,883,571, issued Apr. 21, 1959 To E. G. Friedrich et al. Lamps in which bromine is used as the halogen are also known in the art and are disclosed in U.S. Pat. No. 3,538,373, issued Nov. 3, 1970 to P. C. van der Linden et al. A halogen-cycle incandescent lamp that is dosed with a small quantity of iodine and purged of water vapor, oxygen and similar impurities by placing an alkali metal iodide (such as sodium iodide or potassium iodide) within the envelope during manufacture and then vaporizing it with the energized filament to provide iodine gas and free alkali metal which getters the aforesaid impurities is disclosed in U.S. Pat. No. 3,416,022, issued Dec. 10, 1968 to D. W. Mayer.

One of the problems encountered with the prior art tungsten-halogen lamps is the tendency of the halogen to attack the cooler sections of the filament. This is probably due to the rather large amounts of halogen employed in the lamp atmosphere. Such lamps are also difficult and expensive to manufacture because of the complicated procedures and apparatus required to introduce the halogen or halogen compounds into the lamp envelope. The use of volatile halogen compounds in the manufacture of such lamps also presents a potential safety hazard insofar as such compounds are poisonous and very difficult to handle and store.

SUMMARY OF THE INVENTION

The foregoing problems are avoided in accordance with the present invention by placing a non-volatile material inside the lamp which is activated by the heat from the energized filament and automatically doses the lamp with a minute but controlled amount of either iodine or bromine and, at the same time, provides hafnium, titanium or zirconium (or an alloy of such a metal) which getters oxygen, hydrogen, water, carbon monoxide and carbon dioxide impurities from the lamp atmosphere. The aforesaid material is placed in the lamp envelope before the latter is sealed off and thus serves the dual function of a halogen source and a reactive metal getter in the finished lamp that eliminates the harmful water-cycle which would otherwise occur during operation of the lamp and cause the lamp to blacken and fail prematurely.

Since the getter is of a type that prevents the water-cycle phenomenon from occurring, only a very minute amount of bromine or iodine is needed to prevent the direct vaporization of the filament when the latter is energized and to inhibit the formation of "hot spots" as the lamp is burned. From about 0.005 to 0.07 micromole of $Br_2$ (or $I_2$) per cc. of bulb volume is all that is required. The invention thus provides a lamp which is located, in a functional sense, between conventional incandescent lamps (that are devoid of halogen and have soft glass envelopes) and the prior art halogen-cycle lamps (that are dosed with relatively large concentrations of halogen and have quartz envelopes).

The present invention can, of course, also be employed to manufacture tungsten-halogen lamps which require heavier doses of halogen and operate at higher temperatures and power loadings.

The invention provides the additional advantage of gettering trace impurity gases from a halogen-cycle lamp without the use of sodium (or other alkali metals) which will chemically attack quartz — a material from which the envelopes of such lamps are customarily fabricated.

BRIEF DESCRIPTION OF THE DRAWING

A better understanding of the invention will be obtained from the exemplary embodiments shown in the accompanying drawing, in which.

DESCRIPTION OF THE PREFERRED EMBODIMENTS

Figure 1:
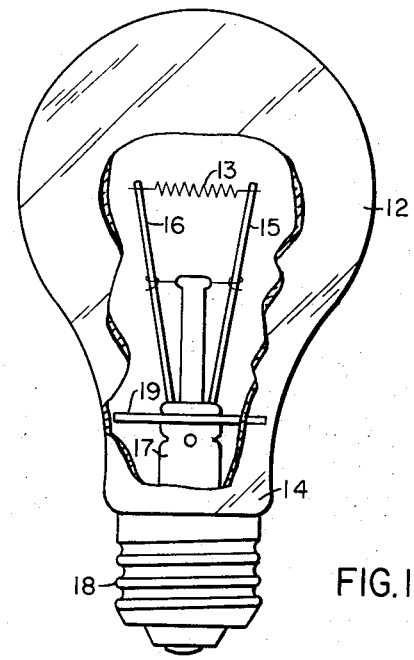
FIG. 1 is an elevational view of a single-ended halogen-containing incandescent lamp embodying the invention, a portion of the envelope being removed for illustrative purposes.
Figure 2:
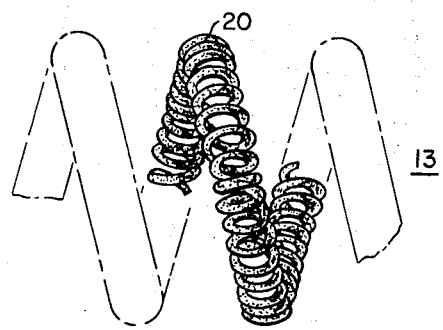
FIG. 2 is an enlarged elevational view of a portion of the coiled-coil filament used in the lamp shown in FIG. 1.

In FIG. 1 there is shown an incandescent lamp 10 which embodies the present invention and is of the single-ended variety. The lamp envelope 12 is composed of standard soda-lime glass (or other well-known soft glass) and has a bulbous-shaped body portion that contains a filament 13 of coiled tungsten wire and is terminated by a sealed neck portion 14. The ends of the filament 13 are fastened to a pair of lead-in wires 15 and 16 that are sealed through the usual glass stem 17 and connected to a base 18 which is cemented to the envelope neck 14 in the well-known fashion. In the embodiment shown, the stem 17 is provided with a heat shield 19 that extends across the bulb neck 14 and prevents excessively high base temperatures. This shield can be omitted in lamps which have a nominal rating below 150 watts or so.

As shown more particularly in FIG. 1, the filament 13 is of the coiled-coil type and is coated with a layer 20 of a getter-halide material which, upon being activated by the heat from the filament when it is energized for the first time, releases a controlled amount of halogen gas (either bromine or iodine) and a getter metal selected from the group consisting essentially of hafnium, titanium and zirconium (Group IVA metals). Suitable thermally-responsive getter-halide materials are listed below in Table I.

TABLE I

| Hafnium Halides | Titanium Halides | Zirconium Halides |
| --- | --- | --- |
| $HfI_2$, $HfBr_2$ | $TiI_2$, $TiBr_2$ | $ZrI_2$, $ZrBr_2$ |
| $HfI_3$, $HfBr_3$ | $TiI_3$, $TiBr_3$ | $ZrI_3$, $ZrBr_3$ |
| $HfI_4$, $HfBr_4$ | $TiI_4$, $TiBr_4$ | $ZrI_4$, $ZrBr_4$ |

Each of the above-listed compounds will thermally dissociate and volatilize at the temperature reached by the incandescent filament 13—thus providing the desired bromine or iodine gas and free Group IVA getter-metal.

As a specific example, the selected getter-halide material can be coated on the tungsten filament 13 by suspending the finely-divided material in a suitable volatile liquid (methanol, for example) to form a slurry that is deposited on the filament and dried in the manner well known to those skilled in the art. If necessary, a suitable binder (such as nitrocellulose) can be included in the slurry mixture. When the fabrication of the lamp 10 is completed and the filament 13 is "flashed" by momentarily energizing it, the coating 20 of getter-halide material volatilizes and decomposes thus releasing a minute but controlled amount of iodine (or bromine) gas into the lamp atmosphere. At the same time, free zirconium (or titanium or hafnium) is deposited on the bulb walls, thereby gettering the residual trace quantities of oxygen, hydrogen, water, carbon monoxide and carbon dioxide which inherently remain within the envelope 12 after it has been evacuated and sealed. The atmosphere of the completed lamp 10 is thus purged of these gaseous impurities and destructive "water-cycling" cannot occur. After the filament 13 has been flashed the coating 20, of course, is completely removed from the coil turns.

The lamp 10 has a nominal rating of from 40 to 300 watts and is charged with a suitable inert fill gas such as nitrogen, argon, krypton (or mixtures of these gases) before the envelope 12 is tipped-off. Thus, the atmosphere within the completed lamp 10 consists essentially of a mixture of a selected inert fill gas (or gases) and a minute quantity of either iodine or bromine gas. As a specific example, in the case of a single-ended 100 watt lamp having an A19 type envelope 250 cc. in volume, the latter contains from 600 to 1000 torr (at room temperature) of a 90 percent argon — 10 percent nitrogen mixture that includes from 0.005 to 0.05 micromole of either iodine or bromine gas per cubic centimeter of envelope volume. If zirconium is the getter metal, 0.25 mg. of $ZrBr_4$ or 0.36 mg. of $ZrI_4$ would be included in the lamp as an additive to provide the minimum amount of halogen gas set forth in the above-mentioned range.

An alloy that contains a major percentage of the aforesaid getter metal can also be used. In the case of zirconium, such an alloy can comprise an alloy of zirconium and tin that contains from 10 to 30 percent by weight tin, a substantial portion of which can be combined with the zirconium in the form of an intermetallic compound $Zr_4Sn$.

If the lamp 10 is of a sufficiently high wattage that portions of the lead wires 15, 16 attain an operating temperature of at least 500°K (227°C.), a selected amount of $HfBr_4$, $ZrBr_4$, $TiBr_4$, $HfI_4$, $ZrI_4$ or $TiI_4$ can be placed on such portions of the leads instead of being coated onto the filament 13. These compounds will volatilize at the aforementioned temperature and thus effect the desired halogen-dosing and gettering actions.

As another alternative, a zirconium, titanium or a hafnium member (or an alloy thereof) can be precharged with iodine or bromine gas and attached to one of the lead wires (or to the stem 17 or heat shield 19) in heat-receptive proximity to the tungsten filament 13 so that the heat produced by the latter, when it is first energized, will release a controlled amount of halogen gas into the atmosphere of the completed lamp 10.

A getter-halide composite can also be prepared by mechanically introducing a suitable halide compound into a getter metal or alloy matrix to form a composite—which composite can then be attached to one of the lead wires 15, 16 (or other part of the mount structure) where it will be heated by the filament 13 and cause the halide to decompose and release the desired amount of iodine or bromine gas. For example, a halide such as $ZrBr_4$ or $ZrI_4$ that dissociates and volatilizes at a low temperature (in the order of around 500°K) would be suitable.

Since the use of zirconium, titanium or hafnium as a getter permits the amount of halogen gas required in the lamp to be reduced to a very low concentration, the potential hazards to personnel handling the halogen-producing materials during lamp manufacture and to persons who operate the finished lamps are practically eliminated.

Figure 3:
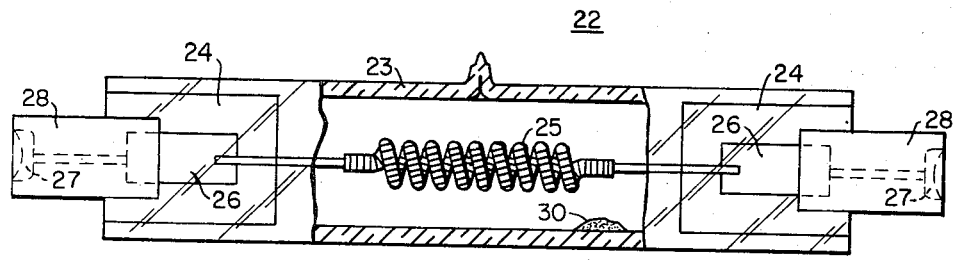
FIG. 3 is an enlarged elevational view, partly in section, of a representative double-ended halogen-tungsten incandescent lamp embodying the invention.

The invention can also be employed with equal advantage in double-ended halogen lamps that have a much higher power loading and require larger amounts of halogen and quartz envelopes. Such a lamp 22 is shown in FIG. 3 and consists of the usual tubular envelope 23 that is closed at each end by a press seal 24 and contains a linear coiled-coil filament 25 of tungsten wire. The latter is suspended longitudinally within the envelope 23 and is connected to lead-in conductor assemblies 26 that are embedded in and pass through the respective press seals 24 to the terminals 27 of suitable base members 28 attached to the seals. Since such lamps are quite compact and designed to operate at nominal ratings of from 250 to 1,500 watts, the envelope 23 is fabricated from quartz or high silica content glass that will withstand the high operating temperatures.

In accordance with this embodiment of the present invention, a predetermined amount of a material 30 is placed inside the envelope 23 in heat-receptive relationship with the filament 25, which material serves both as a source of iodine or bromine gas and a Group IVA getter metal (consisting of Zr, Ti, Hf, or an alloy thereof) in the manner previously described. The required heavier concentration of iodine or bromine gas is provided by including a sufficient amount of the halogen-producing material 30 in the lamp 22. For example, the amount of such material placed within the envelope 23 is sufficient to provide from 0.02 to 0.07 micromole of iodine of bromine gas per cubic centimeter of envelope volume in the finished lamp 22.

As in the previous embodiment, the envelope 23 is charged with a suitable inert fill gas which, in this case, can comprise nitrogen, argon, krypton or xenon and mixtures thereof. The fill gas pressure is not critical and can be in the range of from about 500 to 2,000 torr (at room temperature). However, the fill gas pressure is preferably maintained within a range of from about 600 to 1,000 torr. As a specific example, a lamp having a nominal rating of 400 watts and a T4 type quartz envelope with an outer diameter of 12.7 millimeters is charged with approximately 700 torr of a mixture consisting of 90 percent argon and 10 percent nitrogen.

The combined halogen-source and gettering material can be coated directly onto the filament 25 and can comprise a single thermally-decomposable compound (such as $ZrI_4$, $ZrBr_4$, etc.). It can also consist of a Zr, Ti or Hf member that has been precharged with iodine or bromine as described previously. If the component is a solid member or a strip of material, it can be fastened directly to the coil turns of the filament 25 or secured to the portions of the lead-in conductors 26 that are located adjacent the filament.

As will be apparent to those skilled in the art, when the halogen dosage is such that the metal conductors or lead wires within the lamp will be chemically attacked by the halogen, then these components are fabricated from tungsten or other material which is resistant to such attack.

We claim as our invention:

1. An electric incandescent lamp comprising;
   a sealed vitreous envelope that contains an inert fill gas and a tungsten wire filament,
   a pair of lead-in conductors connected to the ends of said filament, and
   means within said envelope for (a) introducing a halogen into the lamp atmosphere in an amount sufficient to retard the progressive vaporization of the tungsten filament during lamp operation and (b) purging residual gaseous impurities within the envelope comprising a quantity of a material that is disposed in heat-receptive relationship with the filament and, in response to the heat generated by said filament when the latter is first energized, releases a controlled amount of iodine or bromine gas and provides a gettering metal selected from the group consisting essentially of zirconium, titanium, hafnium, and an alloy that contains a major amount of one of said metals.

2. The incandescent lamp of claim 1 wherein said halogen-releasing and impurity-purging material comprises a thermally-decomposable compound selected from the group consisting of the di-, tri-, and tetra-iodides and bromides of hafnium, titanium and zirconium.

3. The incandescent lamp of claim 1 wherein said halogen-releasing and impurity-purging material consists essentially of a body of zirconium, titanium, or hafnium that is precharged with iodine or bromine gas and releases at least some of the latter when it is heated by the energized filament.

4. The incandescent lamp of claim 1 wherein said halogen-releasing and impurity-purging material comprises a thermally-decomposable halide compound that is disposed in a matrix that consists essentially of zirconium, titanium or hafnium.

5. The incandescent lamp of claim 4 wherein said halide compound is selected from the group consisting of a bromide or iodide of hafnium, titanium or zirconium.

6. The incandescent lamp of claim 2 wherein:
   said filament comprises a coil of tungsten wire,
   said envelope is composed of soft glass and has a sealed end portion,
   said lead-in conductors extend from said sealed end portion and are connected to a base member attached to said end portion and said lamp is thus of the single-ended type,
   said inert gas fill comprisea a gas selected from the group consisting of nitrogen, argon, krypton and mixtures thereof at a pressure of from about 600 to 1,000 torr, and
   said halogen-releasing and impurity-purging compound, after being heated by the energized filament, doses the lamp atmosphere with from 0.005 to 0.05 micromole of iodine or bromine per cubic centimeter of envelope volume and provides a quantity of zirconium, hafnium or titanium within the envelope that is sufficient to inhibit the water cycle.

7. The single ended incandescent lamp of claim 6 wherein said envelope is composed of soda-lime glass and said lamp has a nominal rating of from 40 to 300 watts.

8. The incandescent lamp of claim 2 wherein;
   said envelope is of tubular configuration and composed of quartz,
   said filament comprises a coil of tungsten wire that is longitudinally supported within said envelope,
   said lead-in conductors extend through seals at the respective ends of said envelope and the lamp is thus of the double-ended variety,
   said inert fill gas comprises a gas selected from the group consisting of nitrogen, argon, krypton, xenon and mixtures thereof at a pressure of from about 500 to 2,000 torr, and
   said halogen-releasing and impurity-purging compound, after being heated by the energized filament, doses the lamp atmosphere with from 0.02 to 0.07 micromole of iodine or bromine per cubic centimeter of envelope volume and provides a quantity of zirconium, hafnium or titanium within the envelope that is sufficient to inhibit the water cycle.

9. The incandescent lamp of claim 2 wherein said halogen-releasing and impurity-purging compound comprises a predetermined quantity of a tetraiodide or a tetrabromide of Hf, Ti or Zr that is disposed on at least one of said lead-in conductors.

10. The method of dosing an electric incandescent lamp with a predetermined amount of bromine or iodine gas and concurrently purging oxygen, hydrogen, water, carbon monoxide and carbon dioxide from the lamp atmosphere, which method comprises;
    placing a quantity of a getter-halide material consisting essentially of a compound selected from the group consisting of a compound selected from the group consisting of the di-, tri-, and tetra-iodides and bromides of hafnium, titanium and zirconium within the lamp envelope in heat-receptive proximity with the lamp filament during the fabrication of the lamp,
    evacuating and hermetically sealing said envelope, and then
    energizing said filament and thereby effecting the thermal decomposition of said compound.

* * * * *